United States Patent
Gautam et al.

(10) Patent No.: US 7,220,442 B2
(45) Date of Patent: May 22, 2007

(54) NUTRITION BAR AND PROCESS OF MAKING COMPONENTS

(75) Inventors: Akhilesh Gautam, Arlington, TN (US); Albert Johan Zwijgers, Veghel (NL); Mark Edward Johnke, Collinville, TN (US)

(73) Assignee: Slim-Fast Foods Company, division of Conopco, Inc., West Palm Beach, FL (US)

( * ) Notice: Subject to any disclaimer, the term of this patent is extended or adjusted under 35 U.S.C. 154(b) by 119 days.

(21) Appl. No.: 10/371,051

(22) Filed: Feb. 20, 2003

(65) Prior Publication Data

US 2004/0166203 A1     Aug. 26, 2004

(51) Int. Cl.
A23P 1/02     (2006.01)
A23L 1/0562   (2006.01)

(52) U.S. Cl. .................. 426/516; 426/74; 426/312; 426/445; 426/583; 426/629; 426/640; 426/656

(58) Field of Classification Search .................. 426/74, 426/629, 640, 445, 516, 583, 656, 312
See application file for complete search history.

(56) References Cited

U.S. PATENT DOCUMENTS

| | | | |
|---|---|---|---|
| 4,358,465 A | 11/1982 | Brule et al. | |
| 4,361,588 A * | 11/1982 | Herz | 426/104 |
| 4,692,340 A | 9/1987 | Grutte et al. | |
| 4,744,993 A | 5/1988 | Bisson et al. | |
| 4,973,488 A | 11/1990 | Ernster | |
| 5,120,559 A | 6/1992 | Rizvi et al. | |
| 5,120,565 A | 6/1992 | Lanter et al. | |
| 5,232,731 A | 8/1993 | Cain et al. | |
| 5,350,590 A | 9/1994 | McCarthy et al. | |
| 5,417,992 A | 5/1995 | Rizvi et al. | |
| 5,540,932 A | 7/1996 | Lanter et al. | |
| 5,593,714 A | 1/1997 | Hirsch | |
| 5,683,739 A | 11/1997 | Lanter et al. | |
| 5,882,705 A | 3/1999 | Sato et al. | |
| 6,051,236 A | 4/2000 | Portman | |
| 6,197,356 B1 | 3/2001 | Girsh | |
| 6,242,033 B1 | 6/2001 | Sander | |
| 6,248,375 B1 | 6/2001 | Gilles et al. | |
| 6,383,535 B1 | 5/2002 | Sheen et al. | |
| 6,444,700 B1 | 9/2002 | DeMichele et al. | |
| 6,592,915 B1 * | 7/2003 | Froseth et al. | 426/93 |
| 6,607,777 B1 | 8/2003 | Walsh et al. | |
| 2004/0126477 A1 * | 7/2004 | Coleman et al. | 426/620 |

FOREIGN PATENT DOCUMENTS

| | | |
|---|---|---|
| BE | 903 819 | 4/1986 |
| DE | 28 34 851 | 2/1980 |
| DE | 199 06 379 | 8/2000 |
| EP | 306 733 | 3/1993 |
| EP | 306 773 | 3/1993 |
| EP | 768 043 | 4/1997 |
| GB | 1211361 | 11/1970 |
| WO | 00/48473 | 8/2000 |
| WO | 01/22835 | 4/2001 |
| WO | 01/28835 | 4/2001 |
| WO | 01/33976 | 5/2001 |
| WO | 01/41578 | 6/2001 |
| WO | 01/49131 | 7/2001 |
| WO | 01/49132 | 7/2001 |
| WO | 01/62099 | 8/2001 |
| WO | 01/56402 | 9/2001 |
| WO | 02/096208 | 12/2002 |

OTHER PUBLICATIONS

International Search Reports on PCT/EP 2004/000410 mailed Jun. 9, 2004 and Mar. 15, 2005 and Jun. 9, 2004.
Website for www.davisco.com shows info on Bipro.
Swartz, ML, "Food Marketing & Technology", vol. 9, 4, 6, 9-10, 12, 20 (abstracts No. XP-002280622).
Letter from Good Star Foods, Inc. dated Sep. 24, 2004 from Hans Bohner, PhD., Vice President.
Co-pending application for Palmer et al., U.S. Appl. No. 10/613,483, filed Jul. 3, 2003.
Letter dated Dec. 6, 2004 from Next Proteins.

* cited by examiner

*Primary Examiner*—Helen Pratt
(74) *Attorney, Agent, or Firm*—Gerard J. McGowan, Jr.

(57) ABSTRACT

A nutrition bar which incorporates protein in the form of nuggets having high levels of selected proteins. By use of the nuggets of the invention, nutrition bars are formulated to have elevated levels of protein, yet good taste and other organoleptic properties. The nuggets according to the invention include greater than 50 wt % of a non-soy protein selected from the group consisting of milk protein, rice protein and pea protein, especially between 51 wt % and 99 wt %, more preferably between 52 wt % and 95 wt %, most preferably 55 wt % or above. The milk protein is preferably whey protein.

The nuggets of the invention are preferably made using an extrusion process wherein the extrusion temperature is moderated so as to avoid damage to the whey proteins and concomitant off-taste. In this preferred process according to the invention, extrusion is conducted at temperatures of from 60 to 140° C., after which the protein is dried using a belt/conveyor drier or a fluid bed drier. In an alternate method of making the nuggets according to the invention, a lower extrusion temperature of up to 90° C. is used and one or more supercritical fluids are injected prior to extrusion to form a puffed product.

2 Claims, No Drawings

NUTRITION BAR AND PROCESS OF MAKING COMPONENTS

BACKGROUND OF THE INVENTION

Increasingly, a focus of modern preventive medicine is weight reduction. Excessive weight is frequently cited in reports concerning the surge in cases of type 2 diabetes. Moreover, obesity is often mentioned in discussions of other modern diseases, such as heart disease.

For years a debate has raged as to which class of nutrients, fats or carbohydrates, are preferentially minimized to promote weight loss. Recently, much consumer attention has focussed on those who advocate reduction of carbohydrates and higher intakes of unsaturated fat and/or protein.

An increasingly popular form for ingestion of nutrients for those seeking to lose weight is the nutrition bar. The nutrition bar provides a convenient vehicle for replacing a meal or for supplementing meals as a snack. While consumers express a preference for snacks and other foods which are more healthful and which can assist them to achieve their weight loss goals, they show little inclination to sacrifice the organoleptic properties of their favorite foods. Therefore, the successful food formulator must improve the nutrient value of the food while maintaining desirable organoleptic properties. High protein levels are particularly difficult to incorporate into good tasting foods since popular proteins, such as soy, often have undesirable aftertastes.

Lanter et al. U.S. Pat. No. 5,683,739 is directed to extruded animal feed nuggets comprising between about 90 and 99 wt % of at least one protein containing ingredient and between 1 and 6 wt % added fat. The nugget is prepared by plasticizing a blend of at least one protein-containing ingredient, added fat, sulfur (if present), and water, extruding the plasticized blend to form an animal feed nugget, and drying the extruded nugget to a water content of less than about 12 wt %. Protein sources mentioned include oil seed meals such as soybean meal and cottonseed meal, and animal byproduct meals such as meat meal, poultry meal, blood meal, feather meal, and fish meal, plant byproduct meal such as wheat middlings, soybean hulls, and corn byproducts and microbial protein such as torula yeast and brewer's yeast. U.S. Pat. Nos. 5,540,932 and 5,120,565 also are directed to animal feed nuggets which contain, or may contain, protein.

Carr WO 02/096208 (New Zealand Dairy Board) is directed to a dried, enhanced solubility milk protein concentrate (MPC) containing at least one monovalent salt added prior to drying. Preferred salts are sodium and potassium salts. A method for preparing the MPC includes providing an MPC having at least 70% milk protein as dry matter in aqueous solution or suspension, adding at least one monovalent salt in an amount that confers enhanced solubility when dried, and drying the product. Preferably between the salt addition step and the drying step, a dewatering step, preferably by evaporation, or a concentration step by ultrafiltration and/or diafiltration, is undertaken. The MPC of the invention can be used in cheese manufacture. The ratio of casein to whey protein is essentially that of milk.

According to Carr, a problem with MPCs and MPI (milk protein isolates: >85% milk protein as dry matter) is that such products are generally very insoluble at cold temperatures. A problem is said to be that they are associated with the formation of nuggets in the cheese. The solubility properties of the products are said to make the dried MPCs and MPIs advantageous in the preparation of a variety of products, for example, beverages. Also the dried MCPs and MPIs can be used in cheese preparation to avoid nugget formation.

Bhaskar et al. WO 01/41578 is directed to dried milk protein concentrates and their use. The invention includes a process of cheese manufacture using dried MPC or MPI having at least 70% dry matter as milk protein.

Rizvi et al. U.S. Pat. Nos. 5,120,559 and/or 5,417,992 disclose use of supercritical fluids, such as $CO_2$ to extrude a food product.

WO 01/56402 discloses an alpha lipoic acid food supplement for increasing lean muscle mass and strength. A source of amino acids may be included. Whey protein is said to be a preferred source of amino acids. Whey protein isolates, whey peptides, whey protein concentrate or hydrolyzed whey protein may be used. Other proteins which may be used include casein, other milk proteins, and albumins. The food supplements can be in a variety of forms such as protein bars.

Portman U.S. Pat. No. 6,051,236 is directed to a nutritional composition in dry powder form for optimizing muscle performance during exercise. The compositions may be in the form of an energy bar. Proteins such as calcium caseinate, whey protein concentrate, whey protein isolate, soy protein, casein hydrolysate, meat protein concentrate and yeast concentrate are mentioned.

Gilles et al. U.S. Pat. No. 6,248,375 (Abbott Labs) discloses solid matrix materials designed for the person with diabetes. It includes a source of fructose in combination with at least one nonabsorbent carbohydrate. The two component carbohydrate system is said to blunt the postprandial carbohydrate response. One of the forms for administration mentioned is nutritional bars. Gilles et al. mention Ensure® Glucerna® Nutritional Bars as having 14% of total calories as protein in the form of soy protein, calcium caseinate, and corn protein. Choice dm® Bar is cited as a nutritional bar for people with diabetes and including 17.1% total calories as protein in the form of calcium caseinate, soy protein isolate, whey protein concentrate, toasted soybeans, soy nuggets (soy protein isolate, rice flour, malt, salt) and peanut butter. Gluc-O-Bar® is said to be a medical food designed for use in management of diabetes which includes up to 23% of total calories as protein in the form of soy protein isolate, non fat dry milk, and peanut flour.

Gilles et al. use protein which it is said can include any proteins suitable for human consumption, including casein, whey, milk protein, soy, pea, rice, corn, hydrolyzed protein and mixtures thereof. The typical amount of protein will be about 10% to about 25% of total calories, most preferably about 15 to about 20% of total calories. It is said that the solid matrix nutritional compositions may be made by cold extrusion techniques.

Proteint of St. Paul, Minn. makes a nugget having a whey protein level of 50%.

Nuvex of Blue Earth, Minn. makes a nugget having a whey protein level of 50%.

Various other foods have been described which mention nuggets which may include proteins. These include U.S. Pat. Nos. 6,086,941, 6,010,738.

Anon, "Nutraceuticals-International," 2000, Vol 5, p25 (from abstract number 548502) reports that a new milk-protein hydrolysate, Prodiet F200, which is claimed to help people cope with stress, has been marketed by a French company, Ingredia. It is said to be suitable for functional foods such as chocolate bars. Also, a product based on hydrolysed why protein, Proxime Alpha sold by Borculo Domo Ingredients, is said to have beneficial effects on stress.

Swartz, M L, "Milk proteins and hydrolysates in nutritional foods," "Food Ingredients Europe: Conference Proceedings, London, October 1994, published in "Maarssen: Processs Press Europe," 1994, 73–81 (from Abstract number 373368) is a review of recent developments in production of milk proteins and hydrolysates for nutritional products. Application of milk proteins in 3 specific types of nutritional products, including sports bars, are said to be discussed in detail.

Swartz, M L, "Food-Marketing-&-Technology", vol 9, 4, 6, 9–10, 12, 20 (from abstract number 1995-08-P0036) is a review of the nutritional value, functional properties and applications of milk proteins and milk protein hydrolysates. Applications in functional foods such as food bars for athletes are considered.

Kaufman WO 01/33976 (Children's Research Hospital) is directed to a method for treating a type 2 diabetic to decrease hypoglycemic episodes and/or diminish fluctuations in blood glucose outside of the normal range, which comprises administering to the subject in an effective appetite suppressing amount a food composition, which can be a bar, which includes a slowly absorbed complex carbohydrate such as uncooked cornstarch. Soy protein, whey protein and casein hydrolysate are mentioned as possible protein sources.

Keating et al. EP 768 043 (Bristol Meyers-Squibb) is directed to a nutritional composition for use by diabetics containing a controlled absorbed carbohydrate component. The carbohydrate component contains a rapidly absorbed fraction such as glucose or sucrose, a moderately absorbed fraction such as certain cooked starches or fructose and a slowly absorbed fraction such as raw corn starch. Preferred protein sources are said to include whey protein, sodium caseinate, or calcium caseinate, optionally supplemented with amino acids. Other preferred protein sources include protein hydrolysates such as soy protein hydrolysate, casein hydrolysate, whey protein hydrolysate, other animal and vegetable protein hydrolysates and mixtures thereof. Among the forms mentioned which the invention can take are a nutritional bar or cookie. The nutritional bars and cookies are preferably baked. The bar is made by cold forming or extrusion. The granola bar of example 1 includes skim milk powder and peanuts.

EP 306 733 is directed to a sugar free binder for foods which contains sugar substitute and protein hydrolysate in a weight ratio of 3:1 to 1:3 in agglomerated form (as granules).

DeMichele et al. U.S. Pat. No. 6,444,700 (Abbott Labs) is directed to immunonutritional products said to be useful in reducing the immunological suppression said to result from stress. Solid nutritional compositions such as bars are mentioned. Soy proteins are mentioned as possible ingredients for the solid compositions.

Despite the many previous efforts to formulate bars with proteins, there is still a need for a good tasting nutrition bar having elevated levels of protein.

SUMMARY OF THE INVENTION

The present invention is directed especially to a nutrition bar which incorporates protein in the form of nuggets having high levels of selected proteins. By use of the nuggets of the invention, nutrition bars are formulated to have elevated levels of protein, yet good taste and other organoleptic properties.

The nuggets according to the invention include greater than 50 wt % of a non-soy protein preferably selected from the group consisting of milk protein, rice protein and pea protein or mixtures thereof, especially between 51 wt % and 99 wt %, more preferably between 52 wt % and 95 wt %, most preferably 55 wt % or above. The milk protein is preferably whey protein.

The nuggets preferably include one or more of: a coloring agent at less than 1 wt %, especially from 0.01 to 0.5 wt %; flour, especially rice flour, at from 2–8 wt %; and starch, which may for example be tapioca starch or rice starch, at from 20–30 wt %.

The nuggets are preferably present in the nutritional bars of the invention at levels from 5 to 75 wt %, more preferably from 10 to 50 wt %.

A difficulty associated with preparation of nuggets having elevated levels of certain proteins is the sensitivity of the proteins to high temperatures typical of the extrusion process normally used to make the nuggets. Especially is this true of whey proteins. The nuggets of the invention are preferably made using an extrusion process wherein the extrusion temperature is moderated so as to avoid damage to the selected non-soy proteins and concomitant off-taste. In this preferred process according to the invention, extrusion is conducted at temperatures of from 60° C. to 140° C., especially from 70° C. to 130° C., after which the protein is dried using a belt/conveyor drier and/or a fluid bed drier.

In an alternate method of making the nuggets according to the invention, supercritical fluids are injected into the extruder to permit use of lower extrusion temperatures, e.g., up to 95° C., and even the most temperature sensitive proteins, eg, whey. Supercritical fluid which remains in the product after mixing is used to control the final product density by expansion of the product as it exits the extruder die.

The nuggets of the invention may, of course, be used in applications other than the nutritional bars herein.

Nuggets can have a variety of cross sections, e.g., circular, rectangular or square, and generally are bite sized particles having a maximum volume of 35 mm$^3$ and a minimum volume of 4 mm$^3$, preferably between 10 mm$^3$ and 25 mm$^3$. Typically, they will include at least protein, and will often include in addition one or more (preferably all) of: flour (especially rice flour), an additional starch source and, optionally a coloring agent.

For a more complete of the above and other features and advantages of the invention, reference should be made to the following description of the preferred embodiments

DETAILED DESCRIPTION OF THE INVENTION

Preferred sources for the non-soy protein used in the present invention include sources of whey protein such as whey protein isolate and whey protein concentrate, sources of rice protein such as rice flour and rice protein concentrate, and sources of pea protein. Additional protein sources which may be present within the nugget or within the bar external to the nugget include one or more of dairy protein source, such as whole milk, skim milk, condensed milk, evaporated milk, whey, milk solids non-fat, etc. The dairy source may contribute dairy fat and/or non-fat milk solids such as lactose and milk proteins, e.g. whey proteins and caseins. Especially preferred, to minimize the caloric impact, is the addition of protein as such rather than as one component of a food ingredient such as whole milk. Preferred in this respect are protein concentrates such as one or more of whey protein concentrate, milk protein concentrate, caseinates such as sodium and/or calcium caseinate, isolated soy protein and soy protein concentrate. Total protein levels within the nutrition bars of the invention, including protein in the nuggets, are preferably within the range of 3 wt % to 40 wt %, especially from 3 wt % to 20 wt %.

The nuggets of the invention include greater than 50 wt % of protein selected from the group consisting of milk protein, rice protein and pea protein and mixtures thereof, especially between 51 wt % and 99 wt %, more preferably between 52 wt % and 95 wt %, most preferably 55 wt % or above. Other ingredients which may be present in the nuggets would include one or more of other proteins, such as those listed above, lipids, especially triglyceride fats, and carbohydrates, especially starches. Particularly where the nuggets are made using the moderated temperature extrusion process described below, it is advisable that the remaining ingredients be no more sensitive to heat degradation (e.g., have the same or lower degradation point) than the selected non-soy protein.

The source for any fat used in the nutrition bars, whether internal or external to the nugget, is preferably vegetable fat, such as for example, cocoa butter, illipe, shea, palm, palm kernal, sal, soybean, safflower, cottonseed, coconut, rapeseed, canola, corn and sunflower oils, or mixtures thereof. However, animal fats such as butter fat may also be used if consistent with the desired nutritional profile of the product. Preferably the amount of fat in either the nugget or the bar as a whole, is not more than 45 wt %, especially not more than 35 wt %, preferably from 0.5 to 10 wt %, still preferably from 0.5 to 5 wt %.

Carbohydrates can be used within the nugget at levels of from 1% to 49%. In addition to sweeteners mentioned below, examples of suitable carbohydrates include starches such as are contained in rice flour, flour, tapioca flour, tapioca starch, and whole wheat flour and mixtures thereof. Carbohydrates can be used outside the nuggets within the bar as well. Levels of carbohydrates in the bar as a whole will typically comprise from 5 wt % to 90 wt %, especially from 20% to 65 wt %.

If it is desired to include a bulking agent in the nutrition bars, within or external to the nuggets, a preferred bulking agent is inert polydextrose. Other conventional bulking agents which may be used alone or in combination include maltodextrin, sugar alcohols, corn syrup solids, sugars or starches. Total bulking agent levels in the nuggets of the invention, and in the nutritional bars of the invention, will preferably be from about 0% to 20 wt %, preferably 5% to 16%. Polydextrose may be obtained under the brand name Litesse.

Flavorings are preferably added to the nutrition bar in amounts that will impart a mild, pleasant flavor. The flavoring may be in the nuggets or external to the nuggets in the bar, provided that processing is not adversely affected. The flavoring may be any of the commercial flavors employed in nutrition bars, such as varying types of cocoa, pure vanilla or artificial flavor, such as vanillin, ethyl vanillin, chocolate, malt, mint, yogurt powder, extracts, spices, such as cinnamon, nutmeg and ginger, mixtures thereof, and the like. It will be appreciated that many flavor variations may be obtained by combinations of the basic flavors. The nutrition bars are flavored to taste. Suitable flavorants may also include seasoning, such as salt, and imitation fruit or chocolate flavors either singly or in any suitable combination. Flavorings which mask off-tastes from vitamins and/or minerals and other ingredients are preferably included in the products of the invention, in the nuggets and/or elsewhere in the product.

The nuggets and bar may include colorants, if desired, such as caramel colorant.

If desired, the nuggets of the invention may include processing aids such as calcium chloride.

The nuggets may also include emulsifiers. Typical emulsifying agents may be phospholipids and proteins or esters of long chain fatty acids and a polyhydric alcohol. Lecithin is an example. Fatty acid esters of glycerol, polyglycerol esters of fatty acids, sorbitan esters of fatty acids and polyoxyethylene and polyoxypropylene esters of fatty acids may be used but organoleptic properties, or course, must be considered. Mono- and di-glycerides are preferred. If present in the nuggets, emulsifiers may be used in amounts of about 0.03% to 0.3%, preferably 0.05% to 0.1%. The same emulsifiers may also be present in the nutrition bar, again at levels overall of about 0.03% to 0.3%, preferably 0.05% to 0.1%. Emulsifiers may be used in combination, as appropriate.

Among fiber sources which may be included in the compositions of the invention are fructose oligosaccharides such as inulin, guar gum, gum arabic, gum acacia, oat fiber, cellulose and mixtures thereof. The compositions preferably contain at least 2 grams of fiber per 56 g serving, especially at least 5 grams of fiber per serving. As indicated above, additional bulking agents such as maltodextrin, sugar alcohols, corn syrup solids, sugars, starches and mixtures thereof may also be used. Total bulking agent levels in the products of the invention, including fibers and other bulking agents, will preferably be from about 0% to 20%, especially from 1 to 15 wt %. The fiber and the bulking agent may be present in the nuggets or in the bar external to the nuggets provided that processing is not impaired.

Carrageenan may be included in the bars of the invention, internal or external to the nuggets, eg, as a thickening and/or stabilizing agent. Cellulose gel and pectin are other thickeners which may be used alone or in combination.

Generally the nutrition bars which incorporate the nuggets of the invention will be naturally sweetened. The sweetener may be included in the nugget or in the bar provided that it does not interfere with the processing of the nugget (eg, sweetener will not be used in the nugget if it is unstable at the moderate temperatures, where the moderate temperature extrusion process is used). Natural sources of sweetness include sucrose (liquid or solids), glucose, fructose, and corn syrup (liquid or solids), including high fructose corn syrup and high maltose corn syrup and mixtures thereof. Other sweeteners include lactose, maltose, glycerine, brown sugar and galactose and mixtures thereof. Levels of sugars and sugar sources preferably result in sugar solids levels of up to 50 wt %, preferably from 5 to 18 wt %, especially from 10 to 17 wt % of the nutrition bar.

If it is desired to use artificial sweeteners, these may likewise be present in the nugget or within the bar external to the nugget, provided that it does not interfere with processing. Any of the artificial sweeteners well known in the art may be used, such as aspartame, saccharine, Alitame® (obtainable from Pfizer), acesulfame K (obtainable from Hoechst), cyclamates, neotame, sucralose, mixtures thereof and the like. The sweeteners are used in varying amounts of about 0.005% to 1 wt % on the bar, preferably 0.007% to 0.73% depending on the sweetener, for example. Aspartame may be used at a level of 0.05% to 0.15%, preferably at a level of 0.07% to 0.11%. Acesulfame K is preferred at a level of 0.09% to 0.15%.

Calcium is preferably present in the nutrition bars at from 10 to 30% RDA, especially about 25% RDA. The calcium source is preferably dicalcium phosphate. For example wt.

% levels of dicalcium phosphate may range from 0.5 to 1.5%. In a preferred embodiment, the product is fortified with one or more vitamins and/or minerals and/or fiber sources, in addition to the calcium source. These may include any or all of the following:

Ascorbic acid (Vitamin C), Tocopheryl Acetate (Vitamin E), Biotin (Vitamin H), Vitamin A Palmitate, Niacinamide (Vitamin B3), Potassium Iodide, d-Calcium Pantothenate (Vitamin B5), Cyanocobalamin (Vitamin B12), Riboflavin (Vitamin B2), Thiamine Mononitrate (Vitamin B1), Molybdenum, Chromium, Selenium, Calcium Carbonate, Calcium Lactate, Manganese (as Manganese Sulfate), Magnesium (e.g., as magnesium phosphate) Iron (as Ferric Orthophosphate) and Zinc (as Zinc Oxide). The vitamins and minerals are preferably present at from 5 to 45% RDI, especially 5 to 20% RDI, most especially from about 15% RDI. Preferably, fiber sources are present in the product at greater than 0.5 wt. % and do not exceed 6 wt. %, especially 5 wt. %. The vitamins and/or minerals may be included within, or external to, the nuggets, provided that processing and human absorption are not impaired.

Ingredients which, if present, will generally be found within the bar but external to the nuggets include, but are not limited to, rolled oats, chocolate chips or other chocolate pieces, cookie and/or cookie dough pieces, such as oatmeal cookie pieces, brownie pieces, fruit pieces, such as dried cranberry, apple, etc., vegetable pieces such as rice, honey and acidulants such as malic and citric acids, leavening agents such as sodium bicarbonate and peanut butter.

The nuggets of the invention are preferably made by one of two methods, although it is anticipated that alternative methods may be possible. In the first method according to the invention, the nuggets are made using an extrusion process wherein the extrusion temperature is moderated so as to avoid damage to the whey (or other selected non-soy) proteins and concomitant off-taste. In this process, it is expected that a blend of the selected proteins may, for instance, be made having a selected protein content of greater than 50 wt %, up to 70 or 80% or higher. A moisture level of from 10 to 35 wt %, preferably from 15 to 25 wt % prior to extrusion is preferred. An extruder such as a twin screw extruder may be employed. Preferred extrusion temperatures are in the range of between 70 and 130° C., so as not to reach temperatures at which the proteins perceptibly degrade. This embodiment is preferred for rice and pea proteins, especially at the upper ends of the temperature ranges. After extrusion, a cutter may be used to cut the extrudates into the desired length of the nuggets.

In accordance with the first method, the temperature sensitivity of the selected non-soy proteins makes it undesirable to achieve in the extruder temperatures high enough adequately to dry the extrudate. Therefore, a drying step is used subsequent to extrusion to achieve the desired level of moisture. The drying step may comprise, for instance, a belt/conveyor dryer or a fluid bed dryer.

In the second process embodiment of the invention, super critical fluids are used in the extruder, such as is set forth in Rizvi et al. U.S. Pat. Nos. 5,120,559 and/or 5,417,992, the disclosures of which are hereby incorporated by reference. In this embodiment, the nugget ingredients, eg. non-soy protein, rice flour, additional carbohydrate and coloring agent, plus water, are introduced to the feed board and fed to the orifice from which the product is extruded. Water/moisture levels will generally be from 3–15, preferably 4–10 wt %. Prior to extrusion, a supercritical fluid, such as supercritical $CO_2$ is introduced into the extruder. Upon extrusion through the extrusion orifice, the supercritical fluid expands, thereby imparting to the product a desirable expanded texture, e.g., puffing, which is otherwise only possible with elevated temperatures suitable for causing the moisture to boil. Since such elevated temperatures are desirably avoided to prevent degradation of the protein, use of the supercritical fluid permits extrusion of a puffed product including temperature sensitive proteins, such as whey, by avoiding the elevated temperatures. In this alternative process, the temperature in the extruder to which the nugget ingredients are subjected is preferably not more than 95° C., especially within the range of from 70 to 90, especially up to 85° C., more preferably no higher than 80° C.

For $CO_2$, the supercritical fluid may be at, for example, a pressure of at least about 72.9 atmospheres and a temperature of at least about 31° C.

The nutritional bars may be made by known methods provided that the nuggets are not exposed to temperatures which cause degradation of their ingredients, especially the proteins.

Extruded nutritional bars may be made by cooking a syrup containing liquid (at ambient temperature) ingredients and then mixing with dry ingredients. The mixture is then extruded onto a conveyor belt and cut with a cutter. The nuggets of the invention are included among the dry ingredients. The nuggets should only be added to the syrup when the syrup is at a temperature below that at which any of the nugget components degrade. Supercritical fluid extrusion of the bar as a whole at reduced temperatures can also be considered. Syrup ingredients may include components such as corn syrup, glycerine, lecithin and soybean oil or other liquid oils. In addition to the nuggets, other dry components include grains, flours, maltodextrin and milk powders.

Nutritional bars in the form of granola bars may be made by cooking the syrup, adding the dry ingredients, blending the syrup and dry ingredients in a blender, feeding the blended mix through rollers and cutting with a cutter.

The bars of the invention may be coated, eg with milk chocolate or yogurt flavored coating.

Typically, excluding moisture lost during processing, the uncoated bars of the invention will be made from 30–50 wt % syrup, especially 35–45%, and 50–70 wt % dry ingredients, especially 55–65 wt %. Generally coated bars according to the invention will be made from 30–50 wt % syrup, especially 35–45 wt %, 40–50 wt % dry ingredients, especially 40–45% and 0–30 wt % coating, especially 5–25 wt %, particularly 10–20 wt % coating.

Using one of the two preferred methods of the invention, it is believed that nuggets having greater than 50 wt %, especially greater than 60%, more preferably greater than 70 or 80% of selected non-soy proteins selected from the group consisting of milk protein, rice protein and pea protein can be achieved.

It can be expected that the nuggets of the invention may be used in various types of nutrition bars including, without limitation, snack bars and meal replacement bars. One example would be granola bars. The bars of the invention may be coated in whole or in part, eg. with a yogurt flavored coating or a milk chocolate coating.

EXAMPLE 1 (PROPHETIC)

A blend of rice flour, whey protein isolate and whey protein concentrate is mixed to provide a protein content of between 50 and 70%. A twin screw extruder with more than two barrel sections is used. The mixture is extruded through a die of a predetermined shape. The temperature in the two zones closest to the die is set between 70 and 130 C. The temperature of the mixture does not exceed 130° C. during extrusion. The feed material is fed into the extruder at a fixed rate with moisture content between 15 to 40%. At steady state the samples are collected. The excess moisture is dried using a belt/conveyor drier. A cutter is used to cut the extrudates to obtain the desired length of the nuggets. The nuggets thus obtained are included in a nutrition bar at a level of 60 wt % and a good tasting bar, without appreciable off-taste, is obtained.

EXAMPLE 2 (PROPHETIC)

The process of Example 1 is carried out, except that the blend used is a rice protein concentrate/rice flour blend having a protein content between 50 and 80%, and a fluid bed dryer is employed to dry the product.

EXAMPLE 3 (PROPHETIC)

Whey protein (55 wt % based on dry ingredients), rice flour, starch and water are mixed in an extrusion cooker to provide moisture content of from 3 to 15 wt %. The mixture is heated to 85° C. A twin screw extruder with more than two barrel sections is used. Supercritical carbon dioxide is mixed with the nugget ingredients. The mixture is extruded through a die of a predetermined shape. A cutter is used to cut the extrudates to get the desired length of the nuggets. The nuggets thus obtained are included in a nutrition bar at a level 6–60%. A good tasting bar, without appreciable off-taste, is obtained.

Unless stated otherwise or required by context, the terms "fat" and "oil" are used interchangeably herein. Unless otherwise stated or required by context, percentages are by weight.

It should be understood of course that the specific forms of the invention herein illustrated and described are intended to be representative only, as certain changes may be made therein without departing from the clear teaching of the disclosure. Accordingly, reference should be made to the appended claims in determining the full scope.

What is claimed is:

1. A process for preparing a nugget comprising heating one or more nugget ingredients including non-soy proteins selected from the group consisting of milk protein, rice protein and pea protein to a temperature of not greater than 90° C., injecting into said one or more ingredients at a temperature of not greater than 90° C. a supercritical fluid and extruding through an orifice at a temperature no greater than 90° C. said combined one or more ingredients to form a nugget having greater than 50 wt % of said one or more non-soy proteins.

2. The process according to claim 1 wherein said supercritical fluid is carbon dioxide.

* * * * *